UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

AGRICULTURAL SPRAY AND PROCESS OF MAKING SAME.

1,007,682.         Specification of Letters Patent.      Patented Nov. 7, 1911.

No Drawing.      Application filed July 14, 1911. Serial No. 638,514.

*To all whom it may concern:*

Be it known that I, CARLETON ELLIS, a citizen of the United States, and a resident of Montclair, in the county of Essex and State of New Jersey, have invented certain new and useful Improvements in Agricultural Sprays and Processes of Making Same, of which the following is a specification.

This invention relates to agricultural spraying compositions and relates in particular to resin soap compounds preferably containing certain arsenical bodies; all as more fully hereinafter described and as claimed.

The destructive attacks of the white fly (*Aleroydes citri*) and similar pests in the citrus groves of the South have led to a number of recommendations respecting sprays intended for the extermination of this insect. To destroy the larvæ or pupæ in the earlier stages solutions of soap, especially rosin soap have been used with some effect. Soap solutions probably have no real insecticidal action and inhibit the development of the larvæ or pupæ by coating them in such a manner that free access to the air is prevented.

The object of the present invention is to provide a saponaceous compound having, in addition to a sealing-in action, an actual insecticidal value. This I secure by the combination of an arsenical or other insecticide with a soap and by incorporation in the manner to be hereinafter described the arsenical or other insecticide may be caused to exist in a form especially capable of ready and uniform distribution over infected foliage.

Arsenicals containing arsenic in a soluble form are liable to burn foliage and the admixture of lead arsenate and an aqueous solution of rosin soap, for example, sometimes brings about the formation of lead resinate and soluble arsenic compounds. Arsenicals mixed in this way are therefore not regarded as safe to use on tender growth.

In the present invention arsenic in the form of the sulfid or thioarsenate preferably is employed. Preferably also, the arsenical compound in this form, is combined with rosin or fatty acid in the presence of insufficient alkali to satisfy both the soap stock and arsenical compound. For example, yellow or red sulfid of arsenic may be dissolved in caustic potash and a quantity of rosin incorporated therewith sufficient to take up all the alkali as resinate of potash thus precipitating the arsenic as the sulfid. In such a composition the sulfid of arsenic exists, apparently, more or less in a colloidal condition; as, on dilution to a considerable degree with water the soap passes into solution and the sulfid of arsenic remains suspended for a long period forming an opalescent solution, which with yellow arsenic has a faint to pronounced yellow color, depending on the degree of concentration. For ease of shipment a composition of this character may be made in a concentrated form and diluted with water at the time of application, as the property of long continued suspension on dilution is not lost by keeping the concentrated mixture in storage for an indefinite period.

When sulfid of arsenic is dissolved in caustic alkali and precipitated by rosin or a fatty acid a certain proportion of the arsenic remains in a rather soluble form. This may be overcome by the use of alkali thioarsenate, which on precipitation with the acid, yields the sulfid of arsenic substantially free from soluble arsenic compounds.

Beside caustic potash, above mentioned as suitable in preparing the present composition other alkalies, such as the carbonate of soda, hydroxid of soda, ammonia and the like may be employed. As soda produces hard soaps which are not easily diluted, soaps prepared from potash or ammonia are preferable. The latter bases also have utility as fertilizing elements. Ammonia is in one respect preferable to potash, in that being volatile and easily expelled from its combinations with rosin and fatty acids a more lasting effect on foliage is secured with, for example, ammonium resinate than with the corresponding potash compound. When ammonium resinate, in dilute solution, is sprayed on foliage and exposed to air and sunlight the ammonia evaporates leaving a coating of the resin. The latter, deprived of alkali, is insoluble and is not washed off the foliage by rain so that the effect is very enduring. In the case of potash resinate the alkali remains with the resin and rain affects the coating more easily. Ammonium sulfid or ammonia may be used to bring arsenic sulfid into solution to form an alkaline medium for producing the saponified material. Ammonium resinate is easily soluble in water and concentrated solutions having a syrupy consistency, containing sulfid of arsenic and if desired, ammonium sulfid and free sulfur, can be prepared. As ammonia is lost on exposure the composition keeps best in well closed receptacles. Concentrated rosin soaps easily dissolve various oils, which are precipitated in a finely divided condition on dilution. The addition of 10% or more of pine oil, Russian turpentine and the like imparts a higher degree of fluidity to the soap compositions and is recommended both for this reason and also because the oil has a scalecidal action which is often desired. Other oils may similarly be used, including cresylic acid, petroleum oils, tar oils and the like. The oil is best added after the rosin soap and arsenical compound have been combined, although in some instances the oil may be mixed with the rosin prior to saponification.

Mixtures of potash and ammonia or potash and soda or ammonia and soda may be used to secure special consistencies and solubilities on exposure. Obviously it is undesirable to seal up the leaf pores for a long period of time and ammonia sometimes affords too durable a coating, especially during the dry season. Mixtures of the alkalis serve to provide a coating of predetermined or regulable solubility.

This application contains matter divided from my prior application Serial No. 624,355, filed May 1, 1911, for agricultural spray composition.

In the following formulæ rosin will be specified although it should be understood that fatty acids may be used in place of rosin. Of the fatty acids oleic acid is most satisfactory as the potash and ammonia soaps are fluent even in concentrated form. Stearic acid forms soaps which are too hard to be as useful as the rosin soaps. In calculating the alkali required to secure the proper precipitation of the arsenical compound, it should be borne in mind that rosin has a lower saponification equivalent than the fatty acids and allowance made therefor.

An illustration of a rosin composition suitable for combining with potassium polysulfid in order to secure the joint action of both sulfur and rosin, is as follows:—10 pounds of powdered rosin are saponified with two pounds of caustic potash, using a sufficient quantity of water to make a syrupy mixture. This is combined with a solution of potassium polysulfid, containing three pounds of the latter and one pound of yellow sulfid of arsenic. In this case it will be observed that although there is sufficient potash present in the spray to maintain some of the arsenic in solution, and in solution to such extent, in fact, that in the absence of the resin it would probably exert a detrimental effect on the foliage, yet in the presence of the resin, the arsenical compound is sealed to a certain extent from action on foliage while it is present in so effective a form that the toxic action on insect life is pronounced.

Another composition is made by dissolving 20 pounds of powdered resin (colophony) in 25 pounds of water, to which has been added 5 pounds of concentrated ammonia and three pounds of ammonium thioarsenate. This gives a thick syrup which gains slightly in consistency on standing. It is best thinned to a permanent syrup by the addition of some pine oil, Russian turpentine or petroleum, although cresylic acid also may be used in the same way. When a mixture of this sort is introduced into hard water the rosin lime soap which thus forms is softened and even dissolved by the oil, especially if the latter be pine oil or other good solvent for resinate of lime. There is thus less liability of forming a coagulum capable of clogging the spraying nozzles.

Another formula illustrative of the present invention is prepared by dissolving 5 pounds of commercial sulfid of arsenic in a solution made by dissolving 10 pounds of caustic potash in two gallons water. This is diluted with ten gallons or so of water and 80 pounds of powdered rosin is gradually added, cooling the mixture, if necessary by surrounding the receptacle with a water jacket through which cold water is passed. If by the heat of reaction or from the use of initially-warm solutions the temperature becomes too great the arsenical compound coagulates and does not suspend in water properly when the composition is diluted for use. Apparently overheating causes a loss of colloidal form.

While the ordinary red or yellow sulfid of arsenic or other equivalent compound may be used herein, I prefer to employ the yellow sulfid as obtained in the commercial form.

To these compositions, various additions of other modifying or insecticidal bodies may be made as will now be apparent to those skilled in the art, and I do not wish to limit myself to the precise formulæ set forth but desire to embrace those compositions containing a soap or leaf-glazing component and sulfid of arsenic in a very finely-divided and preferably in a colloidal form; such compositions being preferably fluent and easily diluted with water.

What I claim is:—

1. An agricultural spraying composition comprising essentially a soap and colloidal sulfid of arsenic.

2. An agricultural spraying composition comprising essentially a rosin soap and colloidal sulfid of arsenic.

3. An agricultural spraying composition comprising essentially a rosin soap and finely-divided sulfid of arsenic.

4. An agricultural spraying composition comprising essentially a potash rosin soap and finely-divided sulfid of arsenic.

5. An agricultural spraying composition comprising essentially underneutralized potash rosin soap and finely-divided sulfid of arsenic.

6. An agricultural spraying composition comprising underneutralized potash rosin soap, sulfur and finely-divided sulfid of arsenic.

7. An agricultural spraying composition comprising underneutralized potash rosin soap, sulfur, alkali polysulfid and finely-divided sulfid of arsenic.

8. The process of making an agricultural spraying composition which comprises dissolving arsenic sulfid in an alkaline medium and overneutralizing the alkali by the addition of a soap-forming acid.

Signed at Chesham in the county of Cheshire and State of New Hampshire this 8th day of July A. D. 1911.

CARLETON ELLIS.

Witnesses:
BIRDELLA M. ELLIS,
CHARLES H. PEASE.